United States Patent Office 3,514,550
Patented May 26, 1970

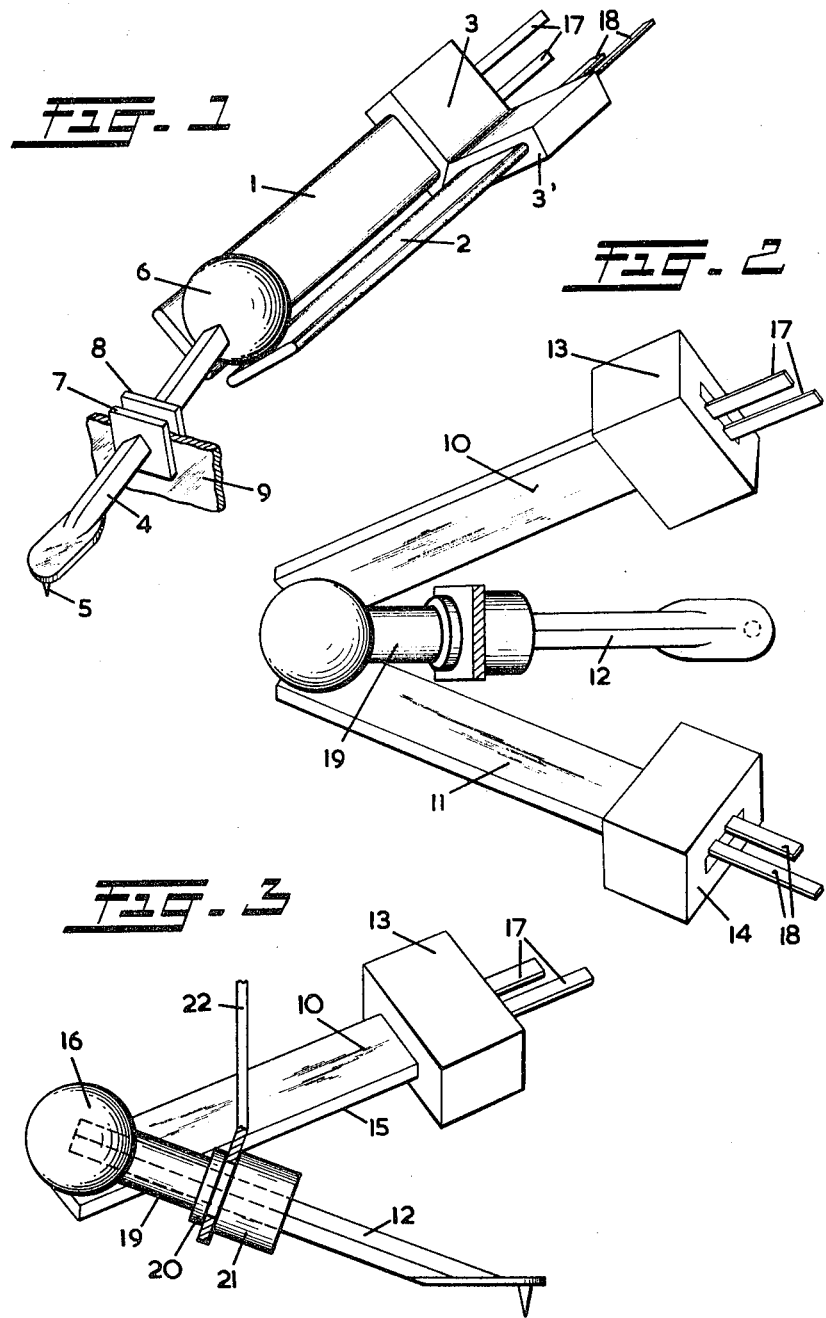

1

3,514,550
STEREOPHONIC PICK-UPS WITH ANTITORSIONAL COUPLING
Machiel de Vries, De Kempenaerstraat 51, Amsterdam, Netherlands
Filed Nov. 22, 1966, Ser. No. 596,111
Claims priority, application Netherlands, Nov. 25, 1965, 6515316
Int. Cl. H04r 1/18, 17/08
U.S. Cl. 179—100.41                            4 Claims

ABSTRACT OF THE DISCLOSURE

A stereophonic pick-up having two piezo-electric transducer elements cantilever mounted so that their main surfaces form a right angle and a stylus holder one end of which loosely bears against the free end main surfaces of said elements. The stylus holder is simultaneously tangential to the longitudinal axes of symmetry of the main surfaces so that the elements are driven with only a bending movement.

---

Stereophonic pick-ups are to an increasing extent equipped with ceramic transducer elements, since this kind of element has specific advantages, such as a relatively small sensitivity to temperature variations. Against the advantages of ceramic transducer elements, there are also some disadvantages. One of these disadvantages is that it is difficult for the two transducer elements comprising a stereophonic pick-up to be driven in exactly the same manner. This difficulty is connected with the fact that ceramic transducer elements are of comparatively small width relative to their length, and that such elements mostly consist of so-called bender elements, which means that the elements are to be loaded purely by bending forces, i.e. not by torsional forces, in order for them to produce electric voltage.

A known pick-up provided with ceramic transducer elements is disclosed in U.S. Pat. No. 3,055,989 to Bechman et al. In this prior construction, the transducer elements are clamped at one narrow end, and driven at the other narrow, free end, by means of a pair of wing-shaped coupling members which are secured to the common stylus holder. In order to ascertain that the transducer elements are loaded by true bending forces, the coupling members should touch and drive the transducer elements precisely on the longitudinal axis of symmetry of the elements. If the coupling members are shifted relative to the longitudinal axes of symmetry, which is possible in the prior construction, then a driving movement of the coupling members results the transducer elements being not only bent, but also twisted, which gives rise to distortions of the output signals, as well as the available mechanical energy supplied by the stylus being incompletely utilized. Because the ceramic transducer elements have a relatively small width, a small dislocation of the coupling members relative to the longitudinal axes of symmetry will soon become a major defect. The problem is to create a vibration transmitting relationship between the stylus holder and the transducer elements, in which deviations of the kind just referred to do not occur, without having to use economically unjustified precision in manufacturing.

It is an object of the invention to provide a solution for this problem.

The invention accordingly provides a stereophonic pick-up comprising two piezo-electric transducer elements mechanically loaded by the action of one and the same stylus holder, said transducer elements and said stylus holder being each locally supported in the pick-up housing. The main surfaces of the transducer elements are at least approximately perpendicular relative to each other, and the adjacent edges of the transducer elements, at least the ends thereof, are located opposite each other in such closely spaced relationship that the stylus holder, within the dihedral angle of about 90°, bears loosely against the main surfaces of the two transducer elements in direct driving relationship thereto. The transducer elements, which have a small width relative to their length, are of the bender type and have their driven ends in a cantilever position. The stylus holder, in the two directions perpendicular to the main surfaces of the two transducer elements, has at least locally equal dimensions so that the stylus holder, moving into the angle along the bisectrix plane of the dihedral angle, is simultaneously tangential to the longitudinal axes of symmetry of both said main surfaces, and this at the cantilever ends of the transducer elements. As a result of this construction the stylus holder is in a so-called pilot relation relative to the transducer elements. This means that if the stylus holder should temporarily lose contact with the transducer elements, it is positively returned into simultaneous contact with the two transducer elements at their longitudinal axes of symmetry.

In a particular embodiment according to the invention, the longitudinal axes of symmetry, or the opposing longitudinal edges of the transducer elements, are disposed in convergant relationship, as viewed from the supported ends of the transducer elements towards their driven ends.

In a particular application of the last-mentioned embodiment, the stylus holder is positioned to extend through the free space between the opposing lateral edges of the transducer elements.

Two embodiments of the invention will now be described, by way of example, with reference to the accompanying drawings, in which FIG. 1 is a perspective view, showing the arrangement of a pair of transducer elements with their supports and a co-operating stylus holder. For the sake of clarity, the housing enveloping these transducer elements has been omitted.

FIG. 2 is a plan view of a pair of transducer elements with their supports, showing the longitudinal axes of the transducer elements disposed at an angle and the stylus holder extending in the other direction relative to the embodiment of FIG. 1.

FIG. 3 is a side-view of the arrangement of FIG. 2, omitting the transducer element located closer to the observer.

Referring to FIG. 1, there is shown a pair of transducer elements of ceramic material 1 and 2, with their leads 17 and 18. As compared with their length, the elements have a relatively small width and thickness. At their one end they are clamped in two blocks of damping material 3 and 3', which are in turn clamped in a cavity provided in the pick-up housing, not shown. In this embodiment, the longitudinal axes of symmetry of the transducer elements 1 and 2 are parallel to each other. A stylus holder 4 carries on one end a stylus 5, and has at the other end a thickened portion 6 which bears directly against the transducer elements 1 and 2. In the embodiment shown, the thickened portion is of spherical shape, but other forms are possible. The important feature is that the thickened portion has the same dimensions in the two directions perpendicular to the main surfaces of the transducer elements. This dimension should be selected such that, when the thickened portion 6 of the stylus holder touches the transducer elements 1 and 2, this takes place on the longitudinal axis of symmetry of each of the transducer elements.

The central portion of the stylus holder further comprises a pair of plates 7 and 8 axially spaced a small distance from each other. Fitted between these plates 7 and 8 is a mounting plate 9, only a part of which is shown in FIG. 1. The mounting plate 9, which is itself secured in the pick-up housing, is formed of a suitable flexible, resilient material, to allow the stylus holder to perform a tilting movement in all directions, causing the mounting plate to be deflected a little in various directions.

A phonograph record to be sensed by the stylus 5 exerts an upward force on the stylus 5, which moves the thickened portion 6 of the stylus holder downwardly. This means that the thickened portion 6 moves in the dihedral angle formed by the main surfaces of the transducer elements 1 and 2. The thickened portion 6 touches the transducer elements 1 and 2 at the same time and the points of contact are necessarily located on the longitudinal axes of symmetry of the transducer elements, in which case the transducer elements 1 and 2 are under a true bending load.

In the embodiments shown FIGS. 2 and 3, the main surfaces of the transducer elements 10 and 11 are mutually perpendicular, just as in the embodiment described before. The longitudinal axes of symmetry of the transducer elements, however, are at an angle relative to each other. This latter feature is a sufficient condition to ensure that in this case, too, movements performed by the stylus holder 12, are resolved into two perpendicular components. To this effect the free ends of the transducer elements 10 and 11 are closely spaced. The other ends of the transducer elements 10 and 11 are clamped in spaced blocks 13 and 14. As a result of this arrangement, the opposing edges of the transducer elements, one of which is shown in FIG. 3 at 15, also extends at an angle to create a space through which the stylus holder 12 can extend without touching the transducer elements other than by means of the thickened portion 16.

The stylus holder 12 shown in FIGS. 2 and 3 is of a construction different from that shown in FIG. 1. The construction of the stylus holder 12 is not correlated to the transducer elements 10 and 11 being disposed at an angle to each other, so that the stylus holder 12 can also be used with the transducer elements 1 and 2. The thickened portion 16 is formed integrally with a tubular connecting member 19, which carries a pair of collars 20 and 21. Disposed intermediate the collars 20 and 21 is a mounting plate 22 secured in the housing.

Because of the fact that the stylus holder 12 extends in a different direction from the embodiment shown in FIG. 1, the length of the pick-up illustrated in FIGS. 2 and 3 may be smaller than in the embodiment of FIG. 1.

The thickened portion 6, 16 of the stylus holder is in both described embodiments proposed as being spherical. Other forms, however, are possible, provided they satisfy the condition that the dimensions of the thickened portion in the two directions perpendicular to the main surfaces of the transducer elements and calculated from the longitudinal axis of the stylus holder are always equal.

I claim:
1. A stereophonic pick-up comprising two piezo-electric transducer elements mechanically loaded by the action of one and the same stylus holder, one end of each said transducer element and said stylus holder being each locally supported in a pick-up housing, the main surfaces of said transducer elements being perpendicular to each other, and the adjacent edges of the transducer elements, at least at the free ends thereof, being located opposite each other in such closely spaced relationship that the stylus holder, within the dihedral angle of 90°, bears loosely against the main surfaces of the two transducer elements in direct driving relationship thereto, said transducer elements having a small width relative to their length and being of the bender type and with their driven ends in cantilever position, and the stylus holder having a symmetrical enlarged portion moving into the angle along the bisectrix plane of the dihedral angle to form a single point of contact simultaneously with the longitudinal axes of symmetry of each of said main surfaces at the free ends of the cantilevered transducer elements.

2. A stereophonic pick-up according to claim 1 wherein the opposing longitudinal edges of the transducer elements are disposed in convergent relationship, as viewed from the supported ends of the transducer elements towards their driven ends.

3. A stereophonic pick-up according to claim 1, wherein the longitudinal axes of symmetry are disposed in convergent relationship, as viewed from the supported ends of the transducer elements towards their driven ends.

4. A stereophonic pick-up according to claim 3, wherein the stylus holder is positioned to extend through the free space between the opposing lateral edges of the transducer elements.

References Cited

UNITED STATES PATENTS

| 3,176,085 | 3/1965 | De Vries | 179—100.41 |
| 3,055,989 | 9/1962 | Bachman et al. | 179—100.41 |
| 3,233,047 | 2/1966 | Weathers | 179—100.41 X |
| 3,348,077 | 10/1967 | Nitsche | 179—100.41 X |

BERNARD KONICK, Primary Examiner

R. F. CARDILLO, Jr., Assistant Examiner

U.S. Cl. X.R.

274—37